March 1, 1955  L. SHINABERY  2,703,001
LOCKING SYSTEM FOR AUTOMOBILE DOORS
Filed Oct. 27, 1950  4 Sheets-Sheet 1

LAWERENCE SHINABERY INVENTOR.

BY
ATTORNEY

March 1, 1955 L. SHINABERY 2,703,001
LOCKING SYSTEM FOR AUTOMOBILE DOORS
Filed Oct. 27, 1950 4 Sheets-Sheet 2

INVENTOR.
LAWERENCE SHINABERY
BY
ATTORNEY

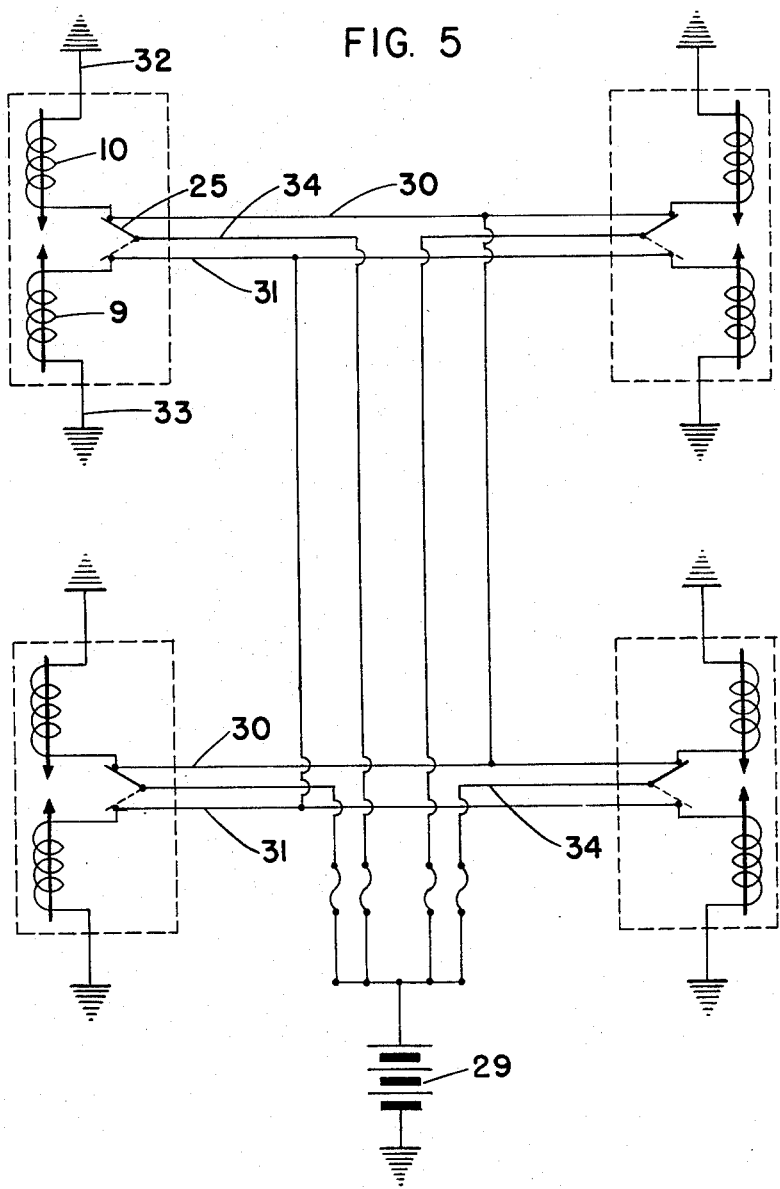

March 1, 1955 — L. SHINABERY — 2,703,001
LOCKING SYSTEM FOR AUTOMOBILE DOORS
Filed Oct. 27, 1950 — 4 Sheets-Sheet 4

LAWERENCE SHINABERY INVENTOR.
BY
ATTORNEY

United States Patent Office 2,703,001
Patented Mar. 1, 1955

2,703,001

LOCKING SYSTEM FOR AUTOMOBILE DOORS

Lawerence Shinabery, Fort Wayne, Ind.

Application October 27, 1950, Serial No. 192,555

6 Claims. (Cl. 70—264)

This invention relates to improvements in a locking system for automobile doors. This application is a continuation in part of my application filed March 19, 1946 Ser. No. 655,411, now abandoned.

In the automobile industry it has become a general practice to provide each door of the automobile with individual latches requiring separate operations for locking and unlocking the doors.

Latches of this type have in connection therewith a push-rod operable from the interior of the automobile upon movement of which from one selected position to another locks or unlocks the latch mechanism accordingly as the push-rod is adjusted. Also, one or more of said latch mechanisms, such as those for the front doors are also equipped with key-operated locks having key holes available from the exterior of the automobile by which the corresponding latch mechanism is locked or unlocked accordingly as the key is manipulated.

An object of the instant invention is to afford a device adapted to be operably connected with each one of the push-rods that control the latches of the individual doors of the automobile to be activated by said push-rods when any one of said push-rods is moved from latch-locking or latch-unlocking position to cause the latches on each of the automobile doors to operate coincidentally so the locking or unlocking of any one of said latch mechanisms occurs substantially at the same time, and in this manner simultaneously lock or unlock all of the doors to which the devices are connected.

Another object of the invention is to provide means operatively connected with all of the individual latch mechanisms of the various doors of an automobile whereby locking or unlocking the latch mechanism on any one of the doors is accompanied by locking or unlocking of the latches on all of the other doors, so arranged that all of the doors are locked or unlocked simultaneously.

And another object of the invention is to afford structure whereby its installation may be readily made in the various makes of automobiles that have the type of latches above described, either at the factory as an initial equipment, or subsequently as an added facility without material alteration of the automobile door structures.

Other objects and advantages of the invention appear in the following description.

An illustrative embodiment of the invention is shown in the accompanying drawings, in which:

Fig. 5 is a diagrammatical view showing the electrical circuits for the solenoid and switch units;

Figure 1:
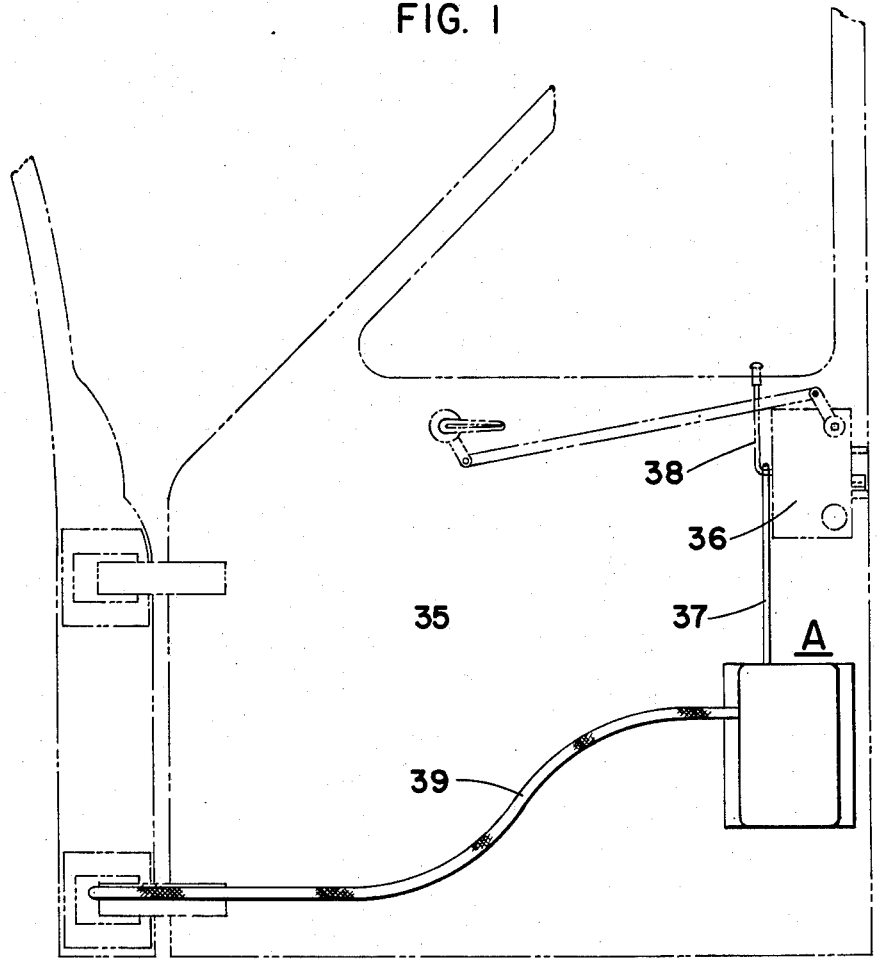
Fig. 1 is a fragmentary interior elevation of an automobile door having thereon a latch mechanism of the usual type to which is connected a unit to be operated thereby, in which the invention is incorporated.
Figure 3:
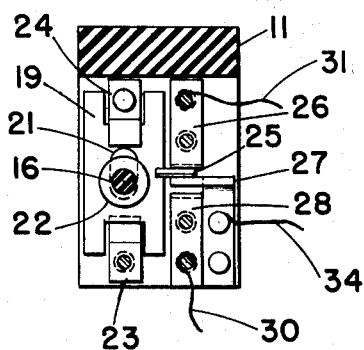
Figure 3 is a transverse section of the switch mechanism, the section being on the line 3—3 of Fig. 2.
Figure 4:
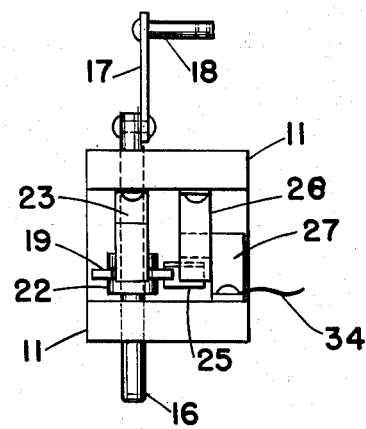
Fig. 4 is an elevational view of the switch mechanism in a plane at right angles to that of Fig. 2.
Figure 2:
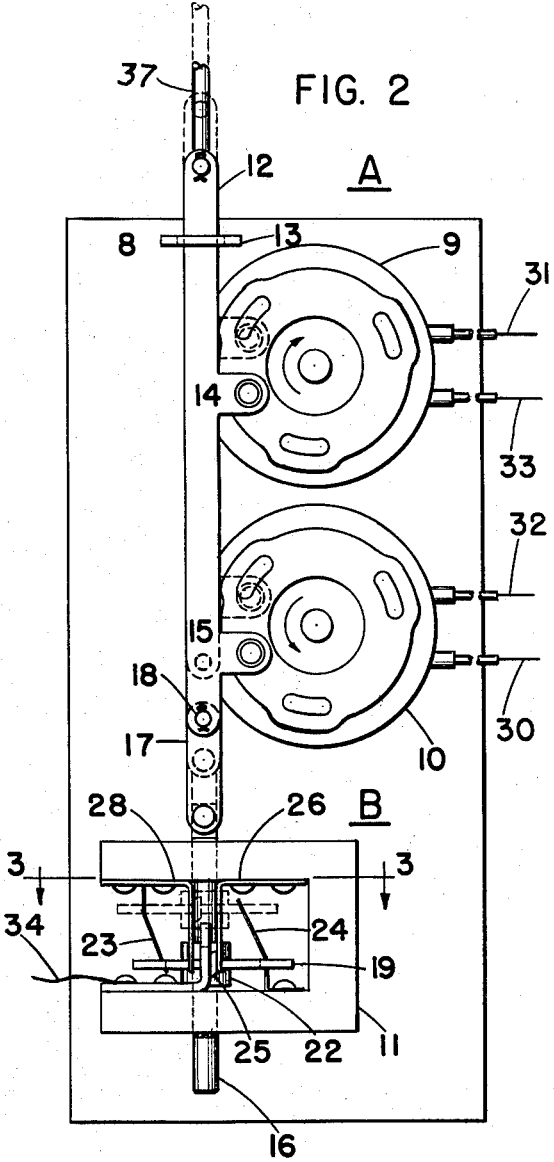
Fig. 2 is a side elevational view of a unit in which is included rotary solenoids and a switch electrically connected therewith.
Figure 6:
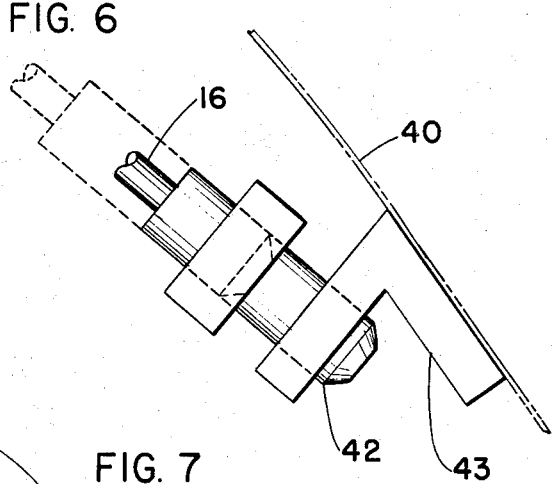
Fig. 6 is a detail side elevational view of parts used for locking a trunk door.
Figure 7:
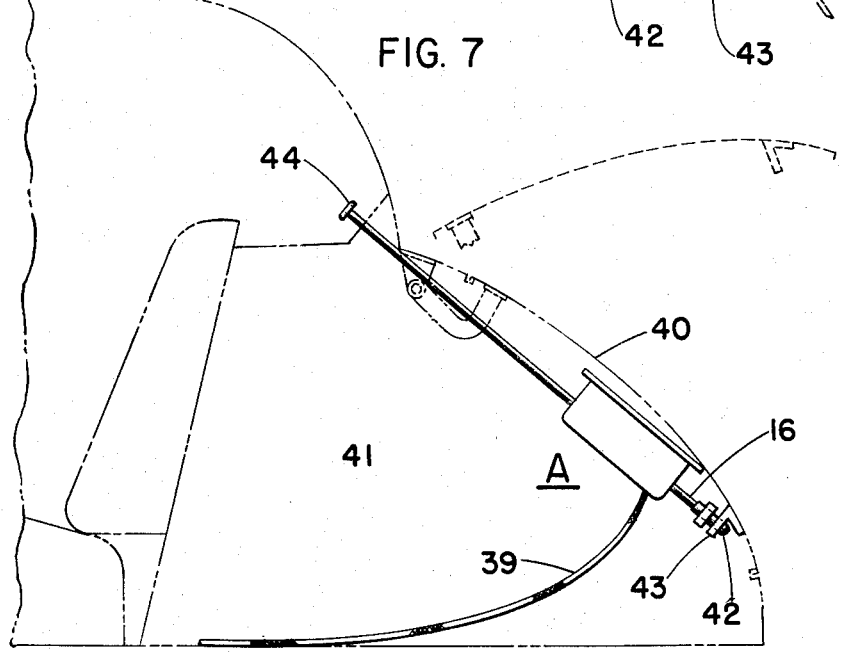
Fig. 7 is a fragmentary side elevational view of a trunk door for the automobile to which is applied a solenoid and trunk unit as a locking means therefor.

The illustrative embodiment of the invention consists of a solenoid and switch unit, shown generally by A, that has a base-plate 8 on which is mounted a pair of rotary solenoids 9 and 10 and a switch box 11. The solenoids used in this structure are a commercial product of the rotary type known as the Leland Rotary Solenoid, the two solenoids being adapted to be activated in opposite directions when energized. On the base-plate is mounted a vertically reciprocating bar 12, the upper end of which extends loosely through a slotted plate 13 that permits lateral play of the bar. The bar is pivotally connected with the uppermost solenoid 9 by an ear 14, and is pivoted to the lowermost solenoid 10 by a similar ear 15 so the bar is impelled downwardly or upwardly by the rotary actions of said solenoids selectively as said solenoids are energized. In the switch box is mounted a vertically sliding rod 16 which is connected at its top by a link 17 with the lower end of the bar 12 by means of a pin 18 which permits lateral swaying of said bar occasioned by the throw of the pivotal connections of the ears 14 and 15 with the solenoids.

On the rod 16 is mounted a longitudinally reciprocable H-plate 19 that moves between guide-springs 23 and 24 in the switch box 11, there being an elongated slot 21 in the H-plate to permit longitudinal movement thereof. The H-plate is secured loosely on the rod 16 by means of collars 22, preferably of insulating material, so that as the rod is vertically reciprocated, the H-plate is moved horizontally. The guide-springs 23 and 24 loosely extend respectively through the corresponding slotted ends of the H-plate so that when the H-plate is raised or lowered it becomes shifted lengthwise in one direction or the other accordingly as the rod is moved.

Extending from one side of the H-plate 19 is a contactor 25 that bears against a contact blade 28 when the H-plate is in its uppermost position, and during movement of the H-plate to its lowermost position the contactor 25 bears momentarily against a second blade-plate 27 thus electrically connecting the blade-plates 27 and 28. The contactor, after passing the blade-plate 27, the electrical connection between the blade-plates 27 and 28 is broken, and the contactor upon completion of the downstroke of the H-plate is shifted by action of the guide-spring 23, causing the contactor to pass beneath the blade-plate 27 into contact with a third blade-plate 26. The blade-plates 26, 27 and 28 are suitably insulated from each other and extend in parallel planes spaced apart. During the upstroke of the H-plate the contactor momentarily forms an electrical connection between blade-plates 26 and 27 and passes over the blade-plate 27 and again into contact with blade-plate 28, the H-plate being shifted to its former position by the corresponding guide-spring 24. In this manner electrical connections are alternately established between the blade-plates 26 and 27 and between the blade-plate 27 and blade-plate 28.

The switches in said units shown generally by B, are arranged with their blade-plates 27 in electrical connection with a source of energy such as the battery 29 (Fig. 5) one terminal of which is grounded, and the plates 26 and 28 are electrically connected respectively with the circuits 30 and 31 for the solenoids 9 and 10, the terminals 32 and 33 of which are grounded. By this arrangement, upon engagement of the contactor 25 with the blade-plate 27 and either of the blade-plates 26 or 28 the corresponding solenoids are energized which has the effect of activating the reciprocating bar 12 downwardly or upwardly according to which of the solenoids are energized. The circuits for the intermediate blade-plates 27 on the diagram is indicated by 34 and the contactors on the H-plates in the switches B are likewise indicated by 25.

The invention is applied to the car by installing one unit A on each of the car doors 35 on the inner side thereof conveniently below the latch mechanism 36 which is of the type above described with which the Packard car of the 1948 model is equipped, and a connecting rod 37 is attached at its upper end with the latch control push-rod 38, and its lower end with the reciprocating bar 12 of the unit A, so that as the push-rod is moved up or down the solenoids 8 and 9 and the switch-rod 16 are accordingly moved and the solenoids and the switches B of the units A on each door are appropriately connected with like solenoids and switches of all of the other units for the other doors by means of electrical extension cables 39, the arrangement being such that the solenoids and switches of all of the units A are electrically connected alike, so that operation of the push-rod of any one of the latch mechanisms causes similar action of all of said units coincidentally.

The invention may be extended to locking of other doors or cover plates of an automobile such as the trunk door 40 by installing a unit A in the trunk compartment 41 and attaching to the lower end of the vertical sliding rod 16 of the switch B a lock-bolt 42 that is adapted to be projected through a bracket 43 secured to the interior wall of the trunk compartment. In this manner the trunk door is locked or unlocked as the other car doors are locked or unlocked. In this instance a push-rod 44 is connected directly with the reciprocating bar 12 for activating the unit A, the operating end of the push-rod being conveniently located within the car. Further extensions may be made for securing the cover of a fuel fill cap (not shown) by installing an additional unit together with suitable locking connections with the cover.

In using the invention thus constructed and installed, moving of any one of the push-rods to its locked position results in coincidental movement of the push-rods for all of the door latches which thereupon are locked. This is accomplished through the media of the units A which are electrified alike and have the same action. Movement of any one of the push-rods to unlocking position results in coincidental movement of the push-rods for all of the door latches which thereupon are unlocked, through the media of the units A.

Upon failure of the source of energy by which the units A are energized, said units idle and the push-rods thereupon operate independently in locking or unlocking the corresponding latches 36. Under this circumstance the various doors are locked or unlocked separately without being affected by the units A which have become impotent for want of energy.

What I claim is:

1. Apparatus for coincidentally locking or unlocking the doors of an automobile, said doors having push rod controls, said apparatus comprising a series of like units each having oppositely acting solenoids and a switch, a movable part in each unit interconnecting the solenoids and switch thereof in such a manner as to be operated by the solenoids and to operate the switch, a rod connecting the movable part of each unit with the push-rod control for the latch of the respective door, and electrical connections interconnecting all of said solenoids and said switches, the electrical connections being arranged to provide corresponding operation of all solenoids by a single one of all of the switches, whereby manual operation of one push-rod will operate the respective movable part to actuate the associated switch for energizing all of the solenoids in a direction to cause operation of the other push-rods.

2. In a lock control appliance for the doors of an automobile, said appliance consisting of a series of units mounted in connection with the respective doors, each unit being activated by an operative connection with the corresponding door latch, a switch in each unit having a rod movable by said operative connection provided with a horizontally movable H-plate, guide-springs in said switch by which said H-plate is moved from one position to another as said H-plate is raised or lowered, said H-plate having a contactor for engagement alternately with blade-plates in said switch, and electrical connections between the switches of each unit whereby action of said switches are alike.

3. Apparatus for locking and unlocking the doors of an automobile, said apparatus comprising a system of units installed respectively in the automobile doors, each unit having movable parts connected respectively with the push-rod controls for the door latches, said movable parts being operated by or serving to operate the respective push-rod control depending upon whether the movable part is being operated to cause energization of the system or is being actuated as a part of the system in response to operation of some other unit of the system, each unit having solenoids operatively connected to said movable parts and selectively operable to move the parts in either of two predetermined directions, a switch operatively connected to each solenoid each switch having operating connections with the respective movable parts and being operated in response to movement of the movable parts, and electrical connections between said switches and said solenoids and through the intermediary of which said solenoids may be energized for producing coincidental and corresponding operation of the movable parts in said units, said electrical connections being such as to cause energization of all of said solenoids correspondingly by operation of any single switch.

4. Apparatus for locking or unlocking the doors of an automobile, said doors having push-rod controls, comprising a series of units installed in the car doors of said automobile, said units having similar electrically operable parts interconnected with movable parts which are operatively connected to the push-rod controls for the respective door latches, and electrical connections between all of said electrically operable parts so arranged as to provide operation of all parts correspondingly, said electrically operable parts comprising control and power elements, a control and power element for each of said units, each power element serving to operate the respective movable part, each control element being operable by the respective movable part, each control element dominating the operation of all power elements irrespective of the operation of other control elements whereby operation of one push-rod will cause operation of all other push-rods.

5. Apparatus for locking or unlocking the doors of an automobile which are equipped with locking mechanisms, comprising a system of units carried by the doors, each unit being provided with first means operatively connected to the mechanism of the respective door, electrically operable means included in each unit and being operatively connected to the respective first means, the electrically operable means of each unit comprising control and power elements, and electrical circuit means interconnecting all of said electrically operable means, each power element serving to operate the respective first means, each control element being operable by the respective first means, each control element dominating the operation of all power elements irrespective of the operation of other control elements whereby operation of the mechanism of any one door will cause operation of the remaining mechanisms of the other doors.

6. Apparatus for locking or unlocking the doors of an automobile which are equipped with locking mechanisms, comprising a system of units carried by the doors, each unit being provided with first means operatively connected to the mechanism of the respective door, electrically operable means included in each unit and being operatively connected to the respective first means, the electrically operable means of each unit comprising control and power elements, and electrical circuit means interconnecting all of said electrically operable means, each power element serving to operate the respective first means, each control element being operable by the respective first means, each control element dominating the operation of all power elements irrespective of the operation of other control elements whereby operation of the mechanism of any one door will cause operation of the remaining mechanisms of the other doors, each control element comprising a rod movable by the movable parts of the respective unit, each rod being provided with a horizontally movable H-plate, guide-springs in said switch by which said H-plate is moved from one position to another as said H-plate is raised or lowered, and blade-plates in said switch, said H-plate having a contactor for engagement alternately with said blade-plates in said switch for making the necessary electrical contacts for providing the aforementioned operation.

References Cited in the file of this patent

UNITED STATES PATENTS

| | | |
|---|---|---|
| 1,210,640 | Goldmerstein | Jan. 2, 1917 |
| 2,212,251 | Seelinger | Aug. 20, 1940 |
| 2,371,370 | Ward | Mar. 13, 1945 |